United States Patent [19]
Combellack

[11] Patent Number: 6,097,262
[45] Date of Patent: Aug. 1, 2000

[54] TRANSMISSION LINE IMPEDANCE MATCHING APPARATUS

[75] Inventor: R. Alan Combellack, Carp, Canada

[73] Assignee: Nortel Networks Corporation, Montreal, Canada

[21] Appl. No.: 09/066,701

[22] Filed: Apr. 27, 1998

[51] Int. Cl.$^7$ ............................... H03H 7/38; H04B 3/28; H04M 7/04

[52] U.S. Cl. ........................... 333/12; 333/24 R; 333/32; 333/177; 333/181; 379/394; 379/398; 379/414; 379/416

[58] Field of Search ............................... 333/12, 32, 24 R, 333/177, 181; 379/394, 398, 414, 416, 443

[56] References Cited

U.S. PATENT DOCUMENTS

| | | | |
|---|---|---|---|
| 3,731,234 | 5/1973 | Collins | 333/12 X |
| 4,951,312 | 8/1990 | Tanikawa et al. | 379/394 |
| 5,095,291 | 3/1992 | Staschover et al. | 333/12 |
| 5,109,206 | 4/1992 | Carlile | 333/12 X |
| 5,113,159 | 5/1992 | Adriaenssens et al. | 333/12 |
| 5,587,692 | 12/1996 | Graham et al. | 333/12 |
| 5,659,273 | 8/1997 | Harpham | 333/32 X |
| 5,705,974 | 1/1998 | Patel et al. | 333/32 X |
| 5,852,613 | 12/1998 | Nagatani et al. | 333/12 X |

FOREIGN PATENT DOCUMENTS

3-19398  1/1991  Japan .

*Primary Examiner*—Robert Pascal
*Assistant Examiner*—Barbara Summons
*Attorney, Agent, or Firm*—Angela C. de Wilton

[57] ABSTRACT

A transmission line impedance matching apparatus is disclosed that limits longitudinal signals and matches the longitudinal characteristic impedance between two conductors and comprises a common mode choke and an impedance matching device. The common mode choke, comprising two windings wound in the same direction, acts as a high impedance to longitudinal high frequency signals. As a result of this, standing waves are caused by the metallic signals reflecting off the choke. The impedance matching device, comprising two windings wound in the same direction, provides a good match to the longitudinal characteristic impedance and thus reduces standing longitudinal waves and reflections. The apparatus may include a terminal corrector or a mid-line corrector, or a combination thereof. This invention may allow greater bandwidth to be dedicated to services and allow transmission over longer subscriber loops before the minimum S/N ratio is achieved.

7 Claims, 5 Drawing Sheets

TRANSMISSION LINE IMPEDANCE MATCHING APPARATUS

FIELD OF THE INVENTION

This invention relates to a transmission line impedance matching apparatus, and more particularly to such an apparatus for limiting longitudinal signals and for matching the longitudinal characteristic impedance between two conductors.

BACKGROUND OF THE INVENTION

Originally wire plant was developed to provide voice service using frequencies within the range of 300 Hz to 4 kHz. Explosive growth in internet and data traffic is necessitating two-way transmission of frequencies much higher than the currently available voice band, however physical limitations in the existing wire plant commonly used in subscriber circuits constrain this from happening. As replacing the extensive copper wire network with high bandwidth fibre optic cables would be prohibitively expensive, telecommunication companies prefer to exploit the current copper wire plant with new high frequency services such as ADSL.

Currently implemented copper wire plant exhibit antenna-like properties at high frequencies. As a result, EMI (electromagnetic interference) becomes a significant contributor to noise within the wire plant, particularly as distance increases, in effect reducing reliability and lowering transmission bandwidth and distance. When ADSL or ISDN is installed at a distant customer site, telephone companies often spend tremendous amounts of time and money troubleshooting noisy connections as a result of this interference.

A similar effect occurs with wires in close spatial proximity with each other, a phenomenon commonly referred to as crosstalk. Metallic signals on one pair cause longitudinal signals on itself and on neighboring pairs, causing increased metallic noise. This is often a cause of "ghost" voices in telephone conversations and the effect increases as frequency increases.

Furthermore, problems occur which are related to the mismatching of the longitudinal characteristic impedance of each wire. As a result of this mismatch, standing longitudinal waves are reflected by the discontinuity toward the source of the longitudinal voltage, further adding to the noise detailed above. This problem is more evident in telecommunications applications where long spans are the norm.

In U.S. Pat. No. 5,095,291 Staschover et al. teach of a communication filter for reducing noise on unshielded twisted pair cable for unidirectional PC LAN applications. However their solution only provides for single-ended termination, which provides small improvements on conductors used for bi-directional communications. In addition, the impedance to ground on the shunt transformer is very low, further exacerbating the effects of the above mentioned mismatching of the longitudinal impedance of the wire plant, particularly at high frequencies. As well, the negligible impedance to ground is unacceptable in telephony applications where telephones are biased at 48 V DC. In effect, the disadvantages caused by the longitudinal impedance mismatch may negate any benefits achieved by the reduction of noise signals.

SUMARY OF THE INVENTION

This invention seeks to provide an impedance matching apparatus which circumvents the above mentioned problems, thus providing a cost effective solution to increase the available bandwidth for new telecommunication services and to provide improved performance for extended subscriber telephone loops using the existing copper wire plant.

One aspect of the invention provides a transmission line impedance matching apparatus for a transmission line having two conductors for connection between a first terminal apparatus and a second terminal apparatus comprising:

a termination corrector located adjacent one of the first or second terminal apparatus having a common mode choke and an impedance matching device, the common mode choke comprising a series transformer having a first winding and a second winding wound in the same direction, the two windings located between the terminal apparatus and the impedance matching device with the first winding being connected to one of the two conductors and the second winding being connected to the other of the two conductors;

the impedance matching device comprising a shunt transformer having a first winding and a second winding wound in the same direction and each with a signal terminal and a ground terminal, the first winding having the signal terminal connected through a capacitance to one of the two conductors and the second winding having the signal terminal connected through a capacitance to the other of the two conductors, the ground terminals of both windings connected through a resistor to a circuit ground.

Thus the termination corrector provides a high impedance to metallic signals at high frequencies and voice band, limits longitudinal signals and provides longitudinal characteristic impedance matching.

According to a second aspect of the present invention there is provided a transmission line impedance matching apparatus for a transmission line having two conductors for connection between a first terminal apparatus and a second terminal apparatus comprising:

a mid-line corrector, positioned between the first and second terminal apparatus, comprising a common mode choke and an impedance matching device directly adjacent each side of the common mode choke, the common mode choke comprising a series transformer having a first winding and a second winding wound in the same direction, the first winding being connected to one of the two conductors and the second winding being connected to the other of the two conductors;

each impedance matching device comprising a shunt transformer having a first winding and a second winding wound in the same direction and each with a signal terminal and a ground terminal, the first winding having the signal terminal connected through a capacitance to one of the two conductors and the second winding having the signal terminal connected through a capacitance to the other of the two conductors, the ground terminals of both windings connected through a resistor to a circuit ground. Preferably, at least one mid-line corrector, or multiple mid-line connectors, provide further improvements in noise characteristics. Advantageously, a mid-line connector is located at a junction wire interface.

Thus the apparatus minimizes the susceptibility of copper wire plant to high frequency EMI noise and to ensure the longitudinal characteristic impedance balance of each wire is properly matched in both directions in order to extend the available bandwidth and increase transmission distance.

BRIEF DESCRIPTION OF THE DRAWINGS

Embodiments of the invention will now be described by way of example, with reference to the accompanying drawings, in which.

DETAILED DESCRIPTION

Figure 1:
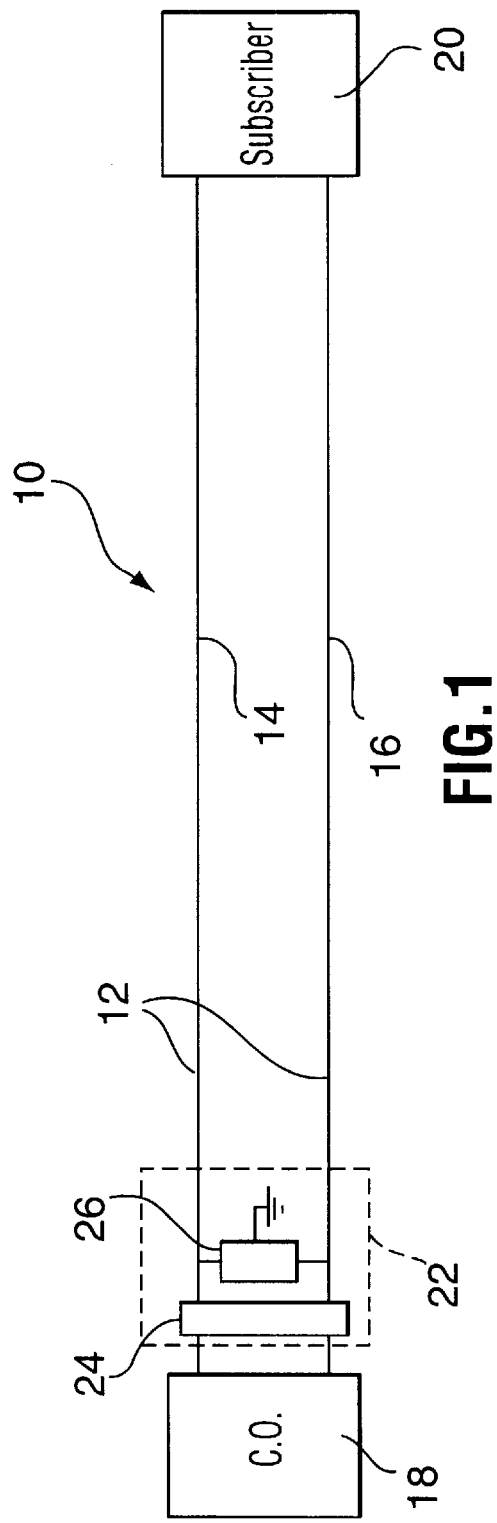
FIG. 1 shows a first embodiment of the invention used in a telecommunications system.
Figure 2:
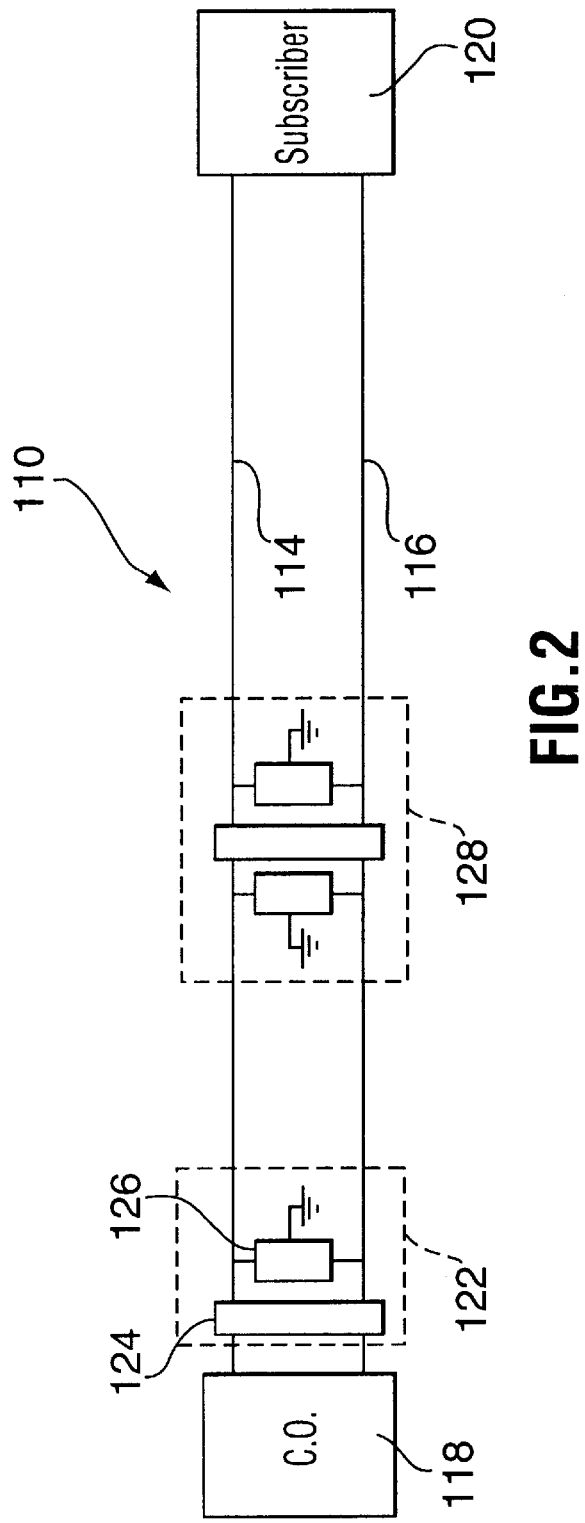
FIG. 2 shows a second embodiment of the invention used in a telecommunications system.

A system including an impedance matching apparatus according to an embodiment of the present invention is shown schematically as 10 in FIG. 1. A transmission line 12 having two conductors 14,16 is connected between two pieces of terminal apparatus. In FIG. 1 the two pieces of terminal apparatus are represented by a central office 18 and a subscriber terminal 20, respectively. A termination corrector 22 is connected between the two conductors 14 and 16 adjacent the central office 18. The termination corrector 22 comprises a common mode choke 24 and impedance matching device 26, and as will be described in more detail below, provides a high impedance to metallic (noise) signals, limits longitudinal signals and provides matching of the longitudinal characteristic impedance.

Beneficially further performance improvement in noise reduction may be achieved using an impedance matching device 110 according to a second embodiment, comprising a termination corrector 122 and a mid-line corrector 128. The latter is similar to the termination corrector 122 (comprising common mode choke 124 and impedance matching device 126) and is provided between two conductors 114 and 116 extending between central office 118 and subscriber terminal 120.

Figure 3:
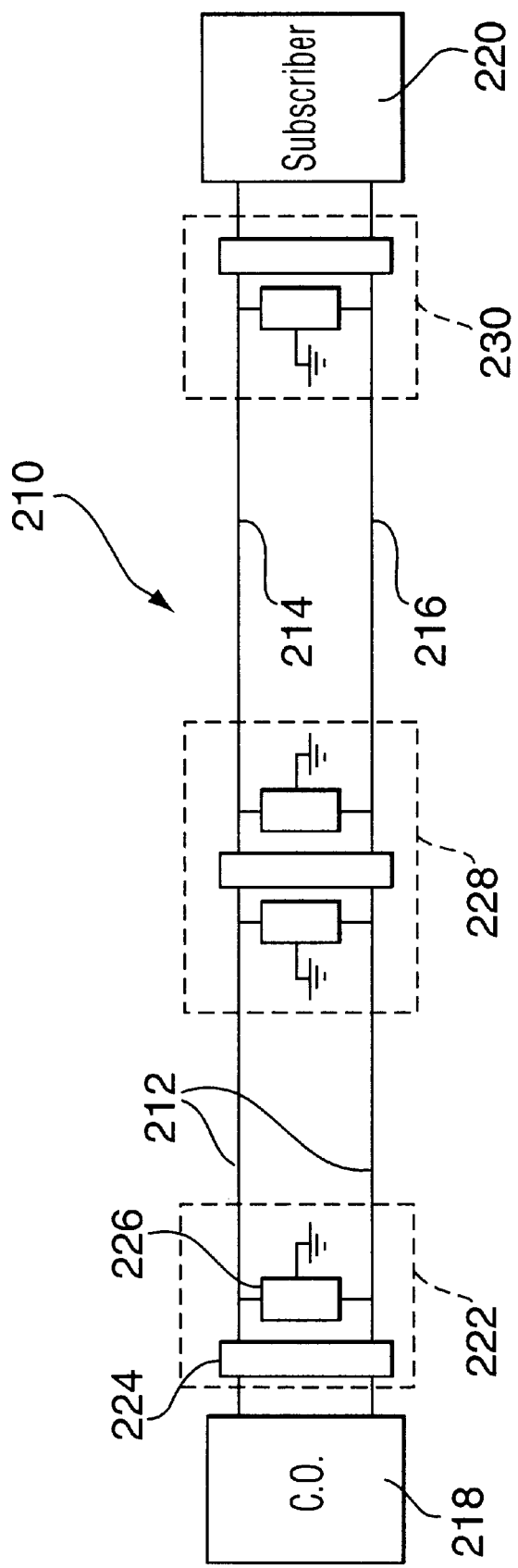
FIG. 3 shows a third embodiment of the invention used in a telecommunications system.

An impedance matching device 210 according to a third embodiment, is shown in FIG. 3, and is similar to the second embodiment, with like elements numbered by the same reference numeral incremented by 100, but comprising a terminating corrector 222 and 230, respectively at each end of the transmission line, and a mid-line corrector 228 which is privided between the two conductors 214 and 216 extending between the mid-line corrector 228 and the subscriber terminal 220.

The terminating correctors 22, 122 and 222 are similar in construction, and will be described with reference to that of the third embodiment 222 and FIGS. 4 and 5.

Each terminating corrector 222,230 and mid-line corrector 228 comprises a common mode choke 224 and an impedance matching device 226.

Figure 4:
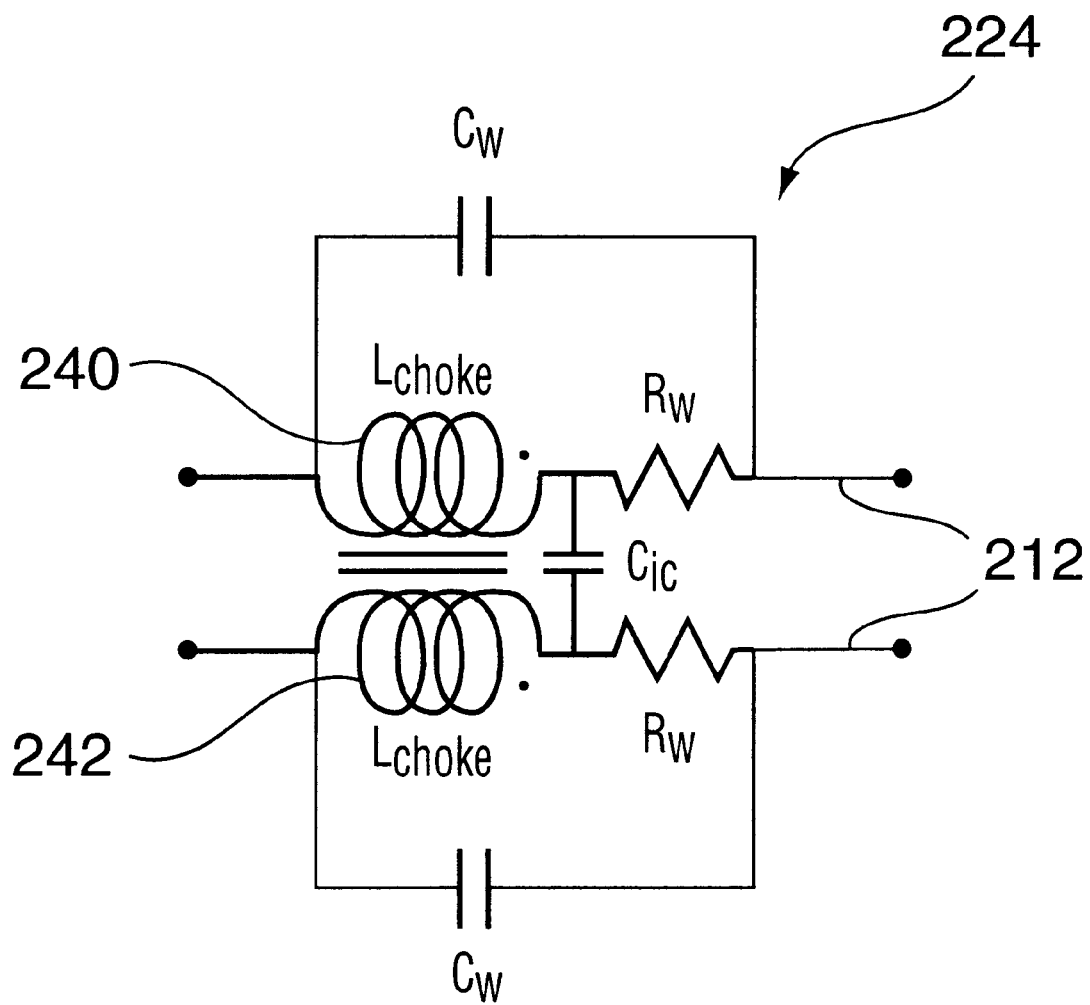
FIG. 4 shows a small signal schematic of an embodiment of the common mode choke of the present invention.

The common mode choke 224, as indicated in FIG. 4, comprises a first winding 240 and a second winding 242, wound in the same direction and each of inductance $L_{choke}$, forming a single transformer. Also indicated in FIG. 4 are the wire resistance and the wire capacitance of each winding, $R_w$ and $C_w$ respectively, and the interwinding capacitance between the first and second windings of the transformer, $C_{ic}$. The first winding 240 is connected between one of the two conductors 212 and the second winding 242 is connected between the other of the two conductors 212.

Figure 5:
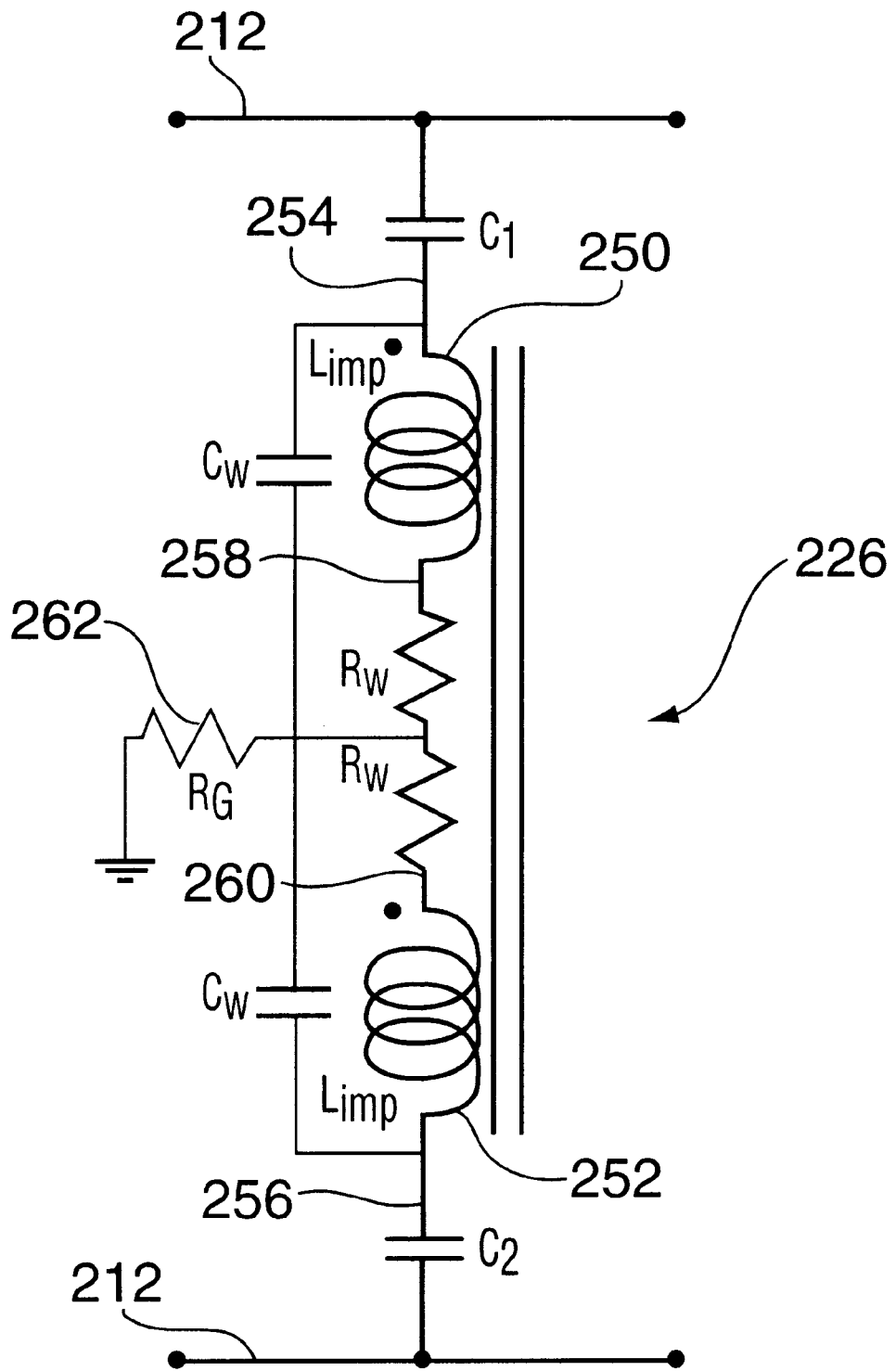
FIG. 5 shows a small signal schematic of an embodiment of the impedance matching device of the present invention.

The impedance matching device 226, as indicated in FIG. 5, is similar in construction to the common mode choke 224 in that it is comprised of a first winding 250 and a second winding 252, wound in the same direction and each of inductance $L_{IMP}$, forming a single transformer. Also included in FIG. 5 are the wire resistance and the wire capacitance of each winding, $R_w$ and $C_w$ respectively. Each winding has a signal terminal 254,256 and a ground terminal 258,260. The signal terminal 254 of the first winding 250 is connected to one of the two conductors 212 through a capacitor $C_1$ while the signal terminal 256 of the second winding 252 is connected to the other of the two conductors 212 through a capacitor $C_2$. The ground terminals 258,260 of windings 250,252 are connected through a resistor 262 to circuit ground, commonly the cable guard. The ground terminals 258,260 can be either connected together through a common resistor 262 as illustrated in FIG. 5 or may be connected to circuit ground through separate resistors (not shown). Alternatively capacitors $C_1$ and $C_2$ can be incorporated into an impedance provided by the resistor 262.

The terminating corrector 222,230 comprises an impedance matching device 226 adjacent a common mode choke 224. It is important that the common mode choke 224 is located between the impedance matching device 226 and the terminating apparatus 218,220, as is shown in FIG. 3. The terminating correctors 222,230 provide a high impedance to metallic signals, thus preventing the signals from passing through.

Preferably, a mid-line corrector 228 is also provided and comprises a common mode choke 224 with an impedance matching device 226 adjacent each side, as shown in FIG. 3. Preferably at least one mid-line corrector is used, and multiple mid-line correctors (not shown) can lead to additional improvements. In telephony applications, ideally a mid-line corrector is located at a junction wire interface. The mid-line corrector 228 is connected so as to present a low impedance ground path to the metallic signals, thus eliminating the possibility of standing waves forming.

The effects of longitudinal signals are more prevalent at higher frequencies, the frequencies most desirable for high bandwidth transmission. The minimum required S/N ratio for data transmission using ISDN or ADSL is considered to be approximately 20 dB before unreliable performance occurs.

Figure 6:
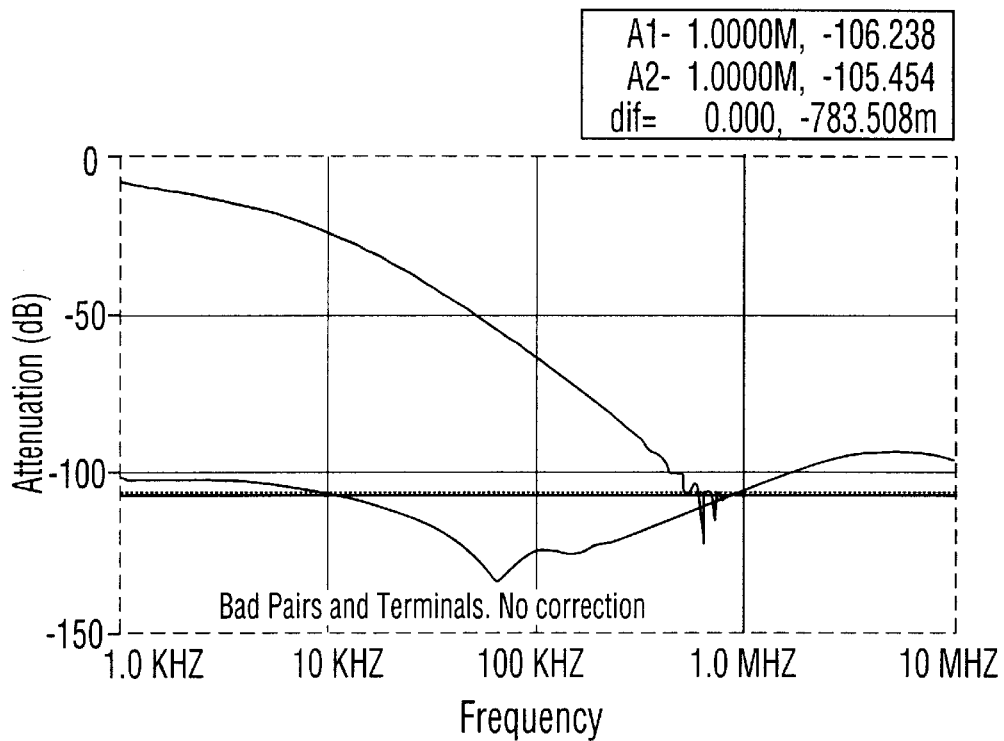
FIG. 6 shows a PSpice™ S/N ratio plot of a 3 mile section having two pair of 26 AWG shielded wire without an apparatus incorporating the present invention.
Figure 7:
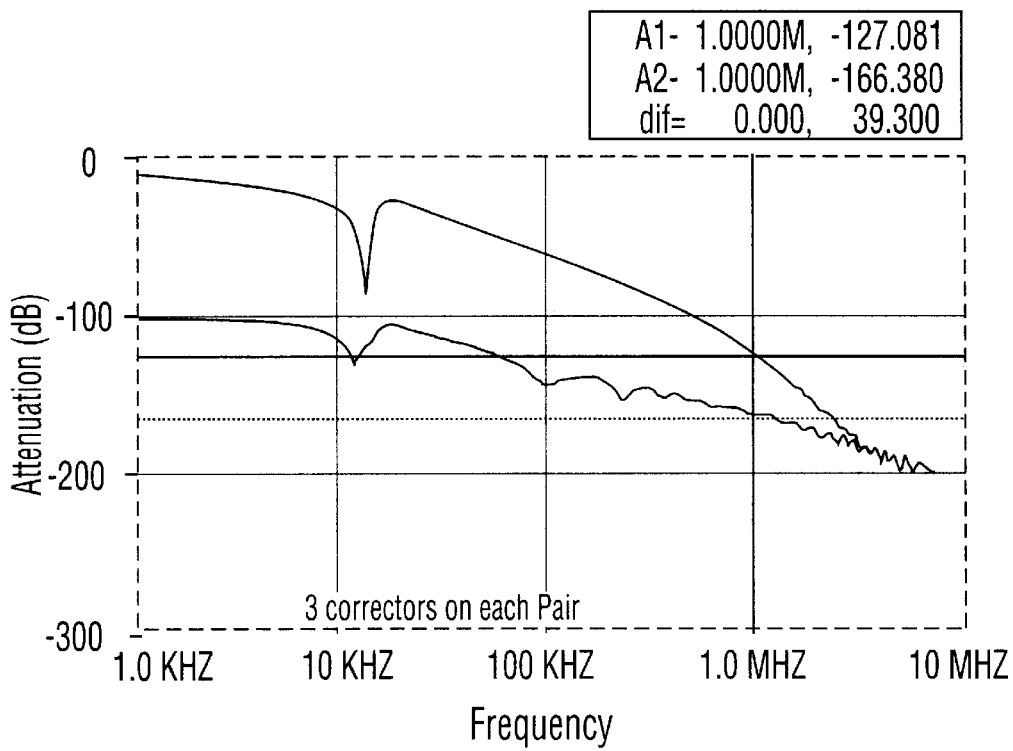
FIG. 7 shows a PSpice™ S/N ratio plot of a 3 mile section having two pair of 26 AWG shielded wire incorporating the third embodiment the present invention.

FIG. 6 shows a PSpice™ S/N ratio plot of a 3 mile section having two pairs of 26 AWG shielded wire without an longitudinal characteristic impedance matching apparatus. At a reference frequency of 1 MHz the S/N ratio is –0.783 dB. FIG. 7 shows a PSpice™ S/N ratio plot of the same two 3 mile pairs of 26 AWG shielded wire incorporating an longitudinal characteristic impedance matching apparatus of the embodiment described above, including two terminating correctors and a single mid-line corrector. At the reference frequency of 1 MHz the S/N ratio is 39.3 dB. A similar experiment incorporating only the mid-line corrector shows improvements of 17.5 dB. This S/N ratio allows extended subscriber loops before the minimum S/N ratio for reliable communications is achieved.

The plot in FIG. 7 shows a downward spike at approximately 10 kHz. This spike is the resonance cause by the RC circuit comprising $C_1/C_2$ and $R_G$. Using these components the resonant frequency may be tuned so as to minimize its effects on subscribers, for example at 10 kHz voiceband communications and high bandwidth data communications is essentially unaffected.

The apparatus of the third embodiment described above which incorporates two terminating correctors and at least one mid-line corrector to reduce longitudinal signal reflections improves performance relative to the first and second embodiments described above using only one terminating corrector and two terminating correctors respectively. Further embodiments may include other combinations of terminating and mid-line connectors, for example a single terminating corrector and at least one mid-line corrector, or one or more mid-line correctors without a terminating corrector, depending on the application and performance improvement required.

Although embodiments of the invention have been described in detail above, it will be appreciated that various modifications to the embodiments may be made without departing from the scope of the claims set out below.

What is claimed is:

1. A transmission line impedance matching apparatus for a transmission line having two conductors to be connected between a first terminal apparatus and a second terminal apparatus comprising:
    a termination corrector located adjacent one of the first or second terminal apparatus having a common mode choke and an impedance matching device,
    the common mode choke comprising a series transformer having a first winding and a second winding wound in the same direction, the two windings located between the terminal apparatus and the impedance matching device with the first winding being connected to one of the two conductors and the second winding being connected to the other of the two conductors;
    the impedance matching device comprising a shunt transformer having a first winding and a second winding wound in the same direction and each with a signal terminal and a ground terminal, the first winding having the signal terminal connected through a capacitance to one of the two conductors and the second winding having the signal terminal connected through a capacitance to the other of the two conductors, the ground terminals of both windings connected through a resistor to a circuit ground.

2. A transmission line impedance matching apparatus according to claim 1 comprising:
    a second termination corrector located adjacent the other terminal apparatus having a common mode choke and an impedance matching device,
    the common mode choke comprising a series transformer having a first winding and a second winding wound in the same direction, the two windings located between the terminal apparatus and the impedance matching device with the first winding being connected to one of the two conductors and the second winding being connected to the other of the two conductors;
    the impedance matching device comprising a shunt transformer having a first winding and a second winding wound in the same direction and each with a signal terminal and a ground terminal, the first winding having the signal terminal connected through a capacitance to one of the two conductors and the second winding having the signal terminal connected through a capacitance to the other of the two conductors, the ground terminals of both windings connected through a resistor to a circuit ground.

3. A transmission line impedance matching apparatus according to claim 2 comprising:
    a mid-line corrector, positioned between two terminating correctors, comprising a common mode choke and an impedance matching device immediately adjacent to on each side of the common mode choke,
    the common mode choke comprising a series transformer having a first winding and a second winding wound in the same direction, the first winding being connected to one of the two conductors and the second winding being connected to the other of the two conductors;
    each impedance matching device comprising a shunt transformer having a first winding and a second winding wound in the same direction and each with a signal terminal and a ground terminal, the first winding having the signal terminal connected through a capacitance to one of the two conductors and the second winding having the signal terminal connected through a capacitance to the other of the two conductors, the ground terminals of both windings connected through a resistor to a circuit ground.

4. A transmission line impedance matching apparatus according to claim 3 wherein the mid-line corrector is located at a junction wire interface.

5. A transmission line impedance matching apparatus according to claim 1 comprising:
    a mid-line corrector comprising a common mode choke and an impedance matching device immediately adjacent to on each side of the common mode choke,
    the common mode choke comprising a series transformer having a first winding and a second winding wound in the same direction, the first winding being connected to one of the two conductors and the second winding being connected to the other of the two conductors;
    each impedance matching device comprising a shunt transformer having a first winding and a second winding wound in the same direction and each with a signal terminal and a ground terminal, the first winding having the signal terminal connected through a capacitance to one of the two conductors and the second winding having the signal terminal connected through a capacitance to the other of the two conductors, the ground terminals of both windings connected through a resistor to a circuit ground.

6. A transmission line impedance matching apparatus according to claim 5 wherein the mid-line corrector is located at a junction wire interface.

7. A transmission line impedance matching apparatus for a transmission line having two conductors for connection between a first terminal apparatus and a second terminal apparatus comprising:
    a mid-line corrector, positioned between the first and second terminal apparatus, comprising a common mode choke and an impedance matching device directly adjacent each side of the common mode choke,
    the common mode choke comprising a series transformer having a first and a second winding wound in the same direction, the first winding being connected to one of the two conductors and the second winding being connected to the other of the two conductors;
    each impedance matching device comprising a shunt transformer having a first and a second winding wound in the same direction and each with a signal terminal and a ground terminal, the first winding having the signal terminal connected through a capacitance to one of the two conductors and the second winding having the signal terminal connected through a capacitance to the other of the two conductors, the ground terminals of both windings connected through an impedance with circuit ground.

* * * * *